United States Patent
Usui et al.

(10) Patent No.: US 10,202,284 B2
(45) Date of Patent: Feb. 12, 2019

(54) METHOD OF PRODUCING ZEOLITE

(71) Applicant: IBIDEN CO., LTD., Ogaki-shi, Gifu (JP)

(72) Inventors: Toyohiro Usui, Gifu (JP); Satoshi Shimada, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 15/578,451

(22) PCT Filed: Jun. 1, 2016

(86) PCT No.: PCT/JP2016/066214
§ 371 (c)(1),
(2) Date: Nov. 30, 2017

(87) PCT Pub. No.: WO2016/194956
PCT Pub. Date: Dec. 8, 2016

(65) Prior Publication Data
US 2018/0148341 A1    May 31, 2018

(30) Foreign Application Priority Data
Jun. 1, 2015  (JP) ................................ 2015-111578

(51) Int. Cl.
| | |
|---|---|
| *B01J 29/06* | (2006.01) |
| *C01B 39/06* | (2006.01) |
| *B01J 37/08* | (2006.01) |
| *B01J 29/76* | (2006.01) |
| *B01J 37/04* | (2006.01) |
| *C01B 39/46* | (2006.01) |
| *B01J 35/02* | (2006.01) |
| *B01J 37/30* | (2006.01) |
| *B01J 37/12* | (2006.01) |
| *C01B 39/48* | (2006.01) |
| *C01G 3/08* | (2006.01) |
| *B01J 29/72* | (2006.01) |

(52) U.S. Cl.
CPC ............ *C01B 39/06* (2013.01); *B01J 29/763* (2013.01); *B01J 35/023* (2013.01); *B01J 37/04* (2013.01); *B01J 37/08* (2013.01); *B01J 37/12* (2013.01); *B01J 37/30* (2013.01); *C01B 39/46* (2013.01); *C01B 39/48* (2013.01); *C01G 3/08* (2013.01); *B01J 29/723* (2013.01); *B01J 2229/186* (2013.01); *C01P 2004/64* (2013.01)

(58) Field of Classification Search
CPC .... B01J 29/723; B01J 29/763; B01J 2229/40; B01J 2229/186; B01J 35/023; B01J 37/04; B01J 37/08; B01J 37/12; B01J 37/30; C01B 39/06; C01B 39/46; C01P 2004/64
USPC .............................. 502/60, 75, 85
See application file for complete search history.

(56) References Cited

U.S. PATENT DOCUMENTS

| | | | | |
|---|---|---|---|---|
| 5,434,114 A | * | 7/1995 | Weitkamp | ................ B01J 29/74 502/74 |
| 5,545,784 A | * | 8/1996 | Weitkamp | ................ B01J 29/74 585/250 |
| 9,895,660 B2 | * | 2/2018 | Janssens | ............ B01D 53/9418 |
| 9,914,114 B2 | * | 3/2018 | Janssens | ................ C01B 39/54 |
| 10,081,010 B2 | * | 9/2018 | Janssens | ................ B01J 37/30 |
| 2007/0015928 A1 | * | 1/2007 | Zhang | .................. B01J 29/7615 554/125 |
| 2011/0165051 A1 | * | 7/2011 | Beutel | ................ B01D 53/9418 423/239.2 |
| 2011/0165052 A1 | | 7/2011 | Beutel et al. | |
| 2012/0087851 A1 | * | 4/2012 | Deuerlein | .......... B01D 53/8628 423/239.2 |
| 2012/0134916 A1 | * | 5/2012 | Fedeyko | ............ B01D 53/8628 423/700 |
| 2013/0108544 A1 | * | 5/2013 | Qi | ............................ B01J 29/85 423/700 |
| 2013/0251611 A1 | * | 9/2013 | Wen | .................... B01D 53/9413 423/213.5 |
| 2013/0280160 A1 | | 10/2013 | Ariga et al. | |
| 2013/0324761 A1 | * | 12/2013 | Hutchings | ............... C07C 27/16 562/549 |
| 2014/0322127 A1 | * | 10/2014 | Althoff | ............. B01D 53/9418 423/714 |
| 2015/0190791 A1 | | 7/2015 | Fedeyko et al. | |
| 2015/0375215 A1 | | 12/2015 | Fedeyko et al. | |

(Continued)

FOREIGN PATENT DOCUMENTS

| | | |
|---|---|---|
| JP | 2012-211066 A | 11/2012 |
| JP | 2013-514167 A | 4/2013 |

(Continued)

OTHER PUBLICATIONS

Shwan et al., "Solid-State ion Exchange of Copper into Zeolites Facilitated by Ammonia at Low Temperature", ACS Catal. 2015, 5, pp. 16-19.*
Clemens et al., "Reaction-driven Ion Exchange of Copper into Zeolite SSZ-13", ACS Catal. 2015, 5, pp. 6209-6218.*
Dang et al., "Chloride-free Cu-modified SAPO-37 catalyst for the oxidative carbonlyation of methanol in the gas phase", Applied Catalysis B: Environmental 121-122, 2012, pp. 115-122.*
Qu et al., "Clarification of copper species over Cu-SAPO-34 catalyst by DRIFTS and DFT study of CO adsorption", Science Chia Chemistry, vol. 60, No. 7, 2017, pp. 912-919.*

(Continued)

*Primary Examiner* — Elizabeth D Wood
(74) *Attorney, Agent, or Firm* — Carrier Blackman & Associates, P.C.; Joseph P. Carrier; Anne G. Sabourin

(57) ABSTRACT

There is provided a method for producing zeolite having a CHA structure in which Cu is carried, the method enabling an increase in ion exchange efficiency of Cu, effective utilization of Cu, and reduction in production cost. The method for producing the zeolite having the CHA structure in which Cu is carried includes a mixing step of mixing a powder of the zeolite having the CHA structure and a powder of Cu salt with each other and a heating step of heating the obtained powder mixture.

7 Claims, 1 Drawing Sheet

(56) References Cited

U.S. PATENT DOCUMENTS

| | | | |
|---|---|---|---|
| 2016/0038875 A1* | 2/2016 | Schuetze | B01D 53/9418 423/700 |
| 2017/0095804 A1* | 4/2017 | Janssens | B01J 29/46 |
| 2017/0182482 A1 | 6/2017 | Blakeman et al. | |
| 2017/0274322 A1* | 9/2017 | Janssens | B01D 53/9418 |

FOREIGN PATENT DOCUMENTS

| | | |
|---|---|---|
| JP | 2013-095653 A | 5/2013 |
| JP | 2014-507361 A | 3/2014 |
| JP | 2014-210221 A | 11/2014 |
| JP | 2015-510448 A | 4/2015 |

OTHER PUBLICATIONS

PCT/ISA/210 from PCT/JP2016/066214 with the English translation thereof.
PCT/ISA/237 from PCT/JP2016/066214.

* cited by examiner

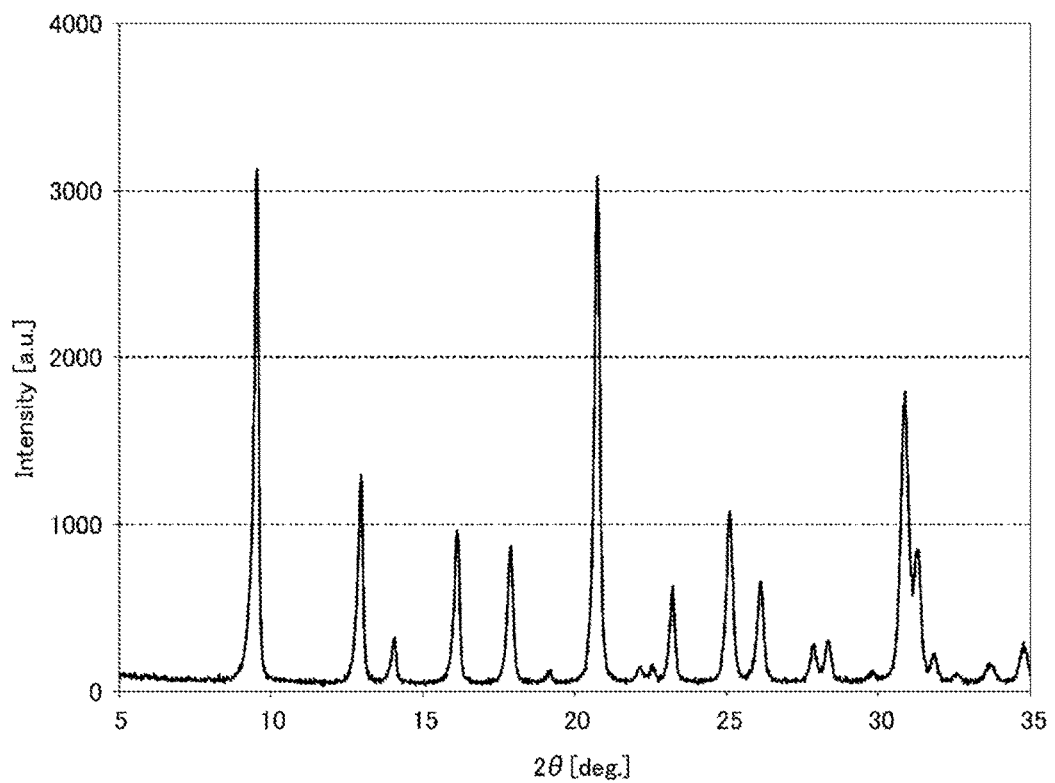

METHOD OF PRODUCING ZEOLITE

TECHNICAL FIELD

The present invention relates to a method for producing zeolite.

BACKGROUND ART

In the related art, as one of systems which purify exhaust gas of an automobile, there has been known a selective catalytic reduction (SCR) system that reduces NOx to nitrogen and water using ammonia, and zeolite having a copper-carried CHA structure is paid attention as zeolite achieving SCR catalysis.

In this SCR system, a honeycomb unit, in which a large number of through holes allowing the exhaust gas to pass therethrough are arranged in parallel to extend in a longitudinal direction, is used as an SCR catalyst carrier. For example, as one that aims to enhance heat resistance and endurance in a case of being used as an SCR catalyst carrier, zeolite having a CHA structure is disclosed in Patent Literature 1 in which a composition ratio of $SiO_2/Al_2O_3$ is less than 15 and a particle size is 1.0 to 8.0 μm.

On the other hand, a method for producing zeolite having a CHA structure in which Cu is carried is disclosed in, for example, Patent Literature 2 in which the zeolite having the CHA structure having a molar ratio of silica to alumina more than 10 is subjected to ion exchanged using copper acetate having a concentration of about 0.001 to 0.25 mol and/or an ammoniacal solution of copper ions.

CITATION LIST

Patent Literature

Patent Literature 1: JP-A-2012-211066
Patent Literature 2: JP-T-2013-514167

SUMMARY OF THE INVENTION

Technical Problem

However, the above-described conventional techniques have the following problems.

That is, according to the technique disclosed in Patent Literature 2, there a problem that only some of the Cu ions in the solution used for the ion exchange is carried on the zeolite and a lot of Cu remains in the solution. Although the solution containing Cu ions can be used repeatedly, it is necessary to adjust the Cu concentration or pH of the solution and remove impurities on all such occasions. Depending on the concentration or the temperature of solution during the ion exchange, Cu may be precipitated in the solution, and thus is not carried on the zeolite in this case. Therefore, a lot of Cu is currently wasted in the course of production of zeolite in the related art.

The present invention has been made to solve the above problems and an object thereof is to provide a method for producing zeolite having a CHA structure in which Cu is carried, the method enabling an increase in ion exchange efficiency of Cu, effective utilization of Cu, and reduction in production cost.

Solution to Problem

That is, a method for producing zeolite of the present invention having a CHA structure, in which Cu is carried, is characterized by including:

a mixing step of mixing a powder of the zeolite having the CHA structure and a powder of Cu salt with each other; and
a heating step of heating the obtained powder mixture.

From extensive studies on a method for producing the Cu-carried zeolite that enables an increase in ion exchange efficiency of Cu and effective utilization of Cu, the inventors have found that the almost total amount of Cu used in the zeolite can be carried by solid-state ion change using a powder of Cu salt rather than the ion exchange in the solution containing Cu ions, whereby ion exchange efficiency of Cu is high, Cu can be effectively used, and production cost can be reduced. In addition, since no solution is used, no waste liquid is generated, and the treatment thereof is also unnecessary.

In the method for producing the zeolite of the present invention, a moisture content of the powder mixture is preferably 30% by mass or less. In the present invention, the solid-state ion exchange is adopted as described above, but the moisture content in the powder mixture is not extremely regulated. Even when the powder mixture contains moisture in air and the moisture content is 30% by mass or less, the ion exchange efficiency of Cu is hardly impaired.

In the method for producing the zeolite of the present invention, a heating temperature of the powder mixture is preferably 250 to 800° C. in the heating step. When the heating temperature is 250° C. or higher, Cu can be efficiently carried on the zeolite. In addition, when the heating temperature is 800° C. or lower, the crystal structure of the zeolite is hardly destroyed.

In the method for producing the zeolite of the present invention, the Cu salt used is preferably at least one salt selected from the group consisting of copper sulfate, copper nitrate, copper acetate, and copper chloride. These Cu salts are low in cost, and can further lower the cost in the method for producing the zeolite of the present invention.

In the method for producing the zeolite of the present invention, the Cu salt used is the copper nitrate, and an atmosphere in the heating step is preferably an oxidizing atmosphere. Since the Cu-carried zeolite is used as an SCR catalyst in the oxidizing atmosphere, a state change can be prevented at the time of actual use. Further, since there is no need to be substituted by a vacuum or a reducing atmosphere in the ion exchange, the heating step can be continuously performed.

In the method for producing the zeolite of the present invention, a Cu/Al (molar ratio) is preferably 0.2 to 0.5 in the zeolite on which Cu is carried. When the molar ratio is 0.2 or more, high NOx purifying performance can be obtained with a small amount of zeolite. In addition, when the molar ratio is 0.5 or less, it is possible to prevent deterioration of NOx purifying performance due to ammonia oxidation at a high temperature. Further, since the molar ratio is 0.2 to 0.5 and Cu is carried with respect to Al contained in the zeolite with high probability, the effect due to the solid-state ion exchange can be further exerted.

In the method for producing the zeolite of the present invention, a $SiO_2/Al_2O_3$ composition ratio (SAR) is preferably less than 15 in the zeolite having the CHA structure. When the composition ratio of the $SiO_2/Al_2O_3$ is less than 15, the purification rate of NOx can be further enhanced. The reason is that, when the $SiO_2/Al_2O_3$ is less than 15, the amount of alumina is increased and the amount of carried Cu serving as a catalyst can be proportionately increased. When the SAR is less than 15, since the amount of Cu salt in the powder mixture is increased relative to the zeolite, the effect due to the solid-state ion exchange can be further exerted.

In the method for producing the zeolite of the present invention, an average particle size is preferably 0.5 μm or less in the zeolite having the CHA structure in which Cu is carried. The particle size of the zeolite is not changed before and after Cu is carried, and in a case of using the zeolite having the small particle size, that is, the average particle size of 0.5 μm or less before Cu is carried, the powder mixture is obtained in which the zeolite and the powder of Cu salt are easily mixed with each other and the powder of Cu salt is not biased, so that the amount of Cu to be carried can be prevented from being partially different.

Advantageous Effects of the Invention

As described above, according to the present invention, it is possible to provide a method for producing zeolite having a CHA structure in which Cu is carried, the method enabling an increase in ion exchange efficiency of Cu, effective utilization of Cu, and reduction in production cost.

BRIEF DESCRIPTION OF THE DRAWINGS

FIG. 1 is a chart illustrating an XRD pattern of zeolite synthesized in Example 1.

DESCRIPTION OF EMBODIMENTS

Detailed Description of the Invention

The present invention will be described below in detail. However, the present invention is not limited to the following description, but can be appropriately modified and applied within the scope and spirit of the present invention.

In the description, the term "mass" means "weight".

A method for producing zeolite is characterized by including the following steps:
a mixing step of mixing a powder of zeolite having a CHA structure and a powder of Cu salt with each other; and
a heating step of heating the obtained powder mixture.

The zeolite produced according to the invention is named and classified with the structure code of CHA by the International Zeolite Association (IZA), and has a crystal structure equivalent to chabazite which is naturally produced.

First, a description will be given on the mixing step in the method for producing zeolite according to the present invention.

Zeolite having a CHA structure (hereinafter, referred to as CHA-type zeolite) may be produced by synthesis or use a commercially available product; however, in the case of the synthesis, first, a raw material composition is prepared which contains a Si source, an Al source, an alkali source, water, and a structure directing agent.

The Si source refers to a compound, salt or composition that is a raw material of a silicon component in the zeolite.

In the method for producing the zeolite of the invention, as the Si source, for example, colloidal silica, amorphous silica, sodium silicate, tetraethyl orthosilicate, and an alumino-silicate gel may be used, and two or more of these may be used in combination. Among these, the colloidal silica is preferred.

In the method for producing the zeolite of the invention, examples of the Al source may include aluminum sulfate, sodium aluminate, aluminum hydroxide, aluminum chloride, an alumino-silicate gel, and a dried aluminum hydroxide gel. Among these, a dried aluminum hydroxide gel is preferred.

In the method for producing the zeolite of the invention, it is desirable to use the Si source and Al source having the substantially same molar ratio as the molar ratio ($SiO_2$/$Al_2O_3$) of the produced zeolite. The molar ratio ($SiO_2$/$Al_2O_3$) in the raw material composition is preferably 5 to 30 and more preferably 10 to 15.

In the method for producing the zeolite of the invention, examples of the alkali source may include sodium hydroxide, potassium hydroxide, rubidium hydroxide, cesium hydroxide, lithium hydroxide, alkali components in aluminate and silicate, and an alkali component in an aluminosilicate gel. Two or more of these may be used in combination.

In the method for producing the zeolite of the invention, the amount of water is not particularly limited. A ratio of the number of moles of water to the total number of moles of Si in the Si source and Al in the Al source (number of moles of $H_2O$/total number of moles of Si and Al) is preferably 12 to 30, and a ratio of the number of moles of water to the total number of moles of Si in the Si source and Al in the Al source (number of moles of $H_2O$/total number of moles of Si and Al) is more preferably 15 to 25.

The structure directing agent (hereafter, also referred to as SDA) indicates an organic molecule defining a pore size, a crystal structure, and the like of the zeolite. In accordance with the kind and the like of the structure directing agent, the structure and the like of the obtained zeolite can be controlled.

In the method for producing the zeolite of the invention, as the structure directing agent, there can be used at least one selected from the group consisting of hydroxide, halides, carbonates, methyl carbonates, sulfates, and nitrates, each of which contains N,N,N-trialkyladamantane ammonium as a cation; and hydroxides, halides, carbonates, methyl carbonates, sulfates, and nitrates, each of which contains an N,N,N-trimethyl benzyl ammonium ion, an N-alkyl-3-quinuclidinol ion, or N,N,N-trialkyl exoamino norbornane as a cation. Among these, preferred is at least one selected from the group consisting of N,N,N-trimethyl adamantane ammonium hydroxide (hereafter, also referred to as TMAAOH), N,N,N-trimethyl adamantane ammonium halide, N,N,N-trimethyl adamantane ammonium carbonate, N,N,N-trimethyl adamantane ammonium methyl carbonate, and N,N,N-trimethyl adamantane ammonium sulfate. More preferred is TMAAOH.

During the synthesis of zeolite in the method for producing the zeolite of the invention, a seed crystal of the zeolite may be further added to the raw material composition. The use of the seed crystal increases a crystallization rate of the zeolite, whereby a time for the production of the zeolite can be shortened, and the yield is improved.

As the seed crystal of the zeolite, the zeolite having the CHA structure is desirably used.

The additional amount of the seed crystal of the zeolite is preferably small. In consideration of the reaction speed and the effect of suppressing impurities, the additional amount is preferably 0.1 to 20% by mass and more preferably 0.5 to 15% by mass relative to the amount of the silica component contained in the raw material composition.

During the synthesis of zeolite in the method for producing the zeolite of the invention, the zeolite is synthesized by reaction of the prepared raw material composition. Specifically, the zeolite is preferably synthesized by hydrothermal synthesis of the raw material composition.

A reaction vessel used for the hydrothermal synthesis is not particularly limited as long as it is usable for the known hydrothermal synthesis, and may be a heat and pressureresistant vessel such as an autoclave. The raw material composition is charged into the reaction vessel, the reaction vessel is sealed and heated, thereby crystallizing the zeolite.

During the synthesis of zeolite in the method for producing the zeolite of the invention, in the case of synthesizing the zeolite, a raw material mixture may be in a stationary state but is preferably mixed under stirring.

In the method for producing the zeolite of the invention, the heating temperature in the case of synthesizing the zeolite is preferably 100 to 200° C. and more preferably 120 to 180° C. When the heating temperature is lower than 100° C., the crystallization rate may be slow, and the yield tends to lower. On the other hand, when the heating temperature is higher than 200° C., impurities tend to be generated.

The heating time in the case of synthesizing the zeolite is preferably 10 to 200 hours. If the heating time is shorter than 10 hours, unreacted raw materials may remain, and the yield tends to lower. On the other hand, if the heating time is longer than 200 hours, the yield or crystallinity is not improved any more.

The pressure in the case of synthesizing the zeolite is not particularly limited and may satisfactorily be a pressure generated during heating of the raw material composition in the sealed vessel within the above temperature range; however, if necessary, an inert gas such as nitrogen gas may be added to increase the pressure.

It is desirable that the CHA-type zeolite obtained as described above is sufficiently cooled, solid-liquid separated, washed with a sufficient amount of water.

The CHA-type zeolite obtained as described above contains the SDA in pores, and accordingly, the SDA may be removed, if needed. For example, the SDA can be removed by liquid state treatment using an acidic solution or a liquid chemical containing a SDA-decomposing component, exchange treatment using a resin, or thermal decomposition.

In the present invention, the CHA-type zeolite has preferably an average particle size of 0.5 μm or less. When the average particle size is 0.5 μm or less, a powder mixture is obtained in which zeolite and powder of Cu salt are easily mixed with each other and the powder of Cu salt is not biased, so that the amount of Cu to be carried can be prevented from being partially different.

As a method of obtaining zeolite having a desired particle size, for example, there may be a method of selecting a silica sol having a specific surface area of 150□500 m²/g as the Si source and a dried aluminum hydroxide gel as the Al source.

The average particle size of the zeolite is obtained by taking a SEM photograph of the zeolite with a scanning electron microscope (SEM, manufactured by Hitachi High-Technologies Corporation, S-4800) and averaging the lengths of all diagonal lines of 10 particles. The measurement conditions are set to acceleration voltage: 1 kV, emission: 10 μA, and WD: 2.2 mm or less. In general, the particles of the CHA-type zeolite have a cubic shape and have a square shape in a two-dimensional SEM photograph. Accordingly, each particle includes two diagonal lines.

The specific surface area of the silica sol can be obtained in such a manner that particle sizes of solid contents of the silica sol are measured by being imaged with a transmission electron microscope (TEM) at 500,000 times and the particle sizes is converted into a specific surface area. Major axes and minor axes of the particles in the TEM image are measured using a scale to obtain an average value, and the average value is taken as a particle size of the particles. In a similar manner, 20 particles are measured to obtain an average value of particle sizes, and the average value is taken as a total particle size. The specific surface area is calculated by the following calculation formula. A density of silica to be employed is 2.2 g/cm³.

Specific surface area (m²/g)=6000/(Particle size (nm)×Density (g/cm³))

In the mixing step of the present invention, the powder of CHA-type zeolite and the powder of Cu salt are mixed with each other.

The Cu salt is preferably one or more salts selected from the group consisting of copper sulfate, copper nitrate, copper acetate, and copper chloride from the viewpoint of production cost.

As a mixing condition in the mixing method, for example, a known mixer such as a mortar, a food processor, or a Henschel mixer is used, and a mixing time is, for example, 1 to 30 minutes, and preferably 1 to 10 minutes.

In the method for producing the zeolite of the invention, a mixing ratio of the powder of CHA-type zeolite and the powder of Cu salt is preferred such that Cu/Al (molar ratio) is 0.2 to 0.5, as will be described below, in the zeolite on which Cu is carried.

A powder mixture containing the powder of CHA-type zeolite and the powder of Cu salt obtained in this manner is obtained. The moisture content of the powder mixture may be 30% by mass or less. In the present invention, as will be described below, solid-state ion exchange is adopted instead of liquid-state ion exchange, but the moisture content in the powder mixture is not extremely regulated. Specifically, the moisture content in the powder mixture may be 30% by mass or less, and even with this moisture content, the effect of enhancing ion exchange efficiency of Cu is hardly impaired. In the method for producing the zeolite according to the present invention, the moisture content in the powder mixture is preferably 1 to 20% by mass.

When the moisture content is 1% by mass or more, the powders are not charged to static electricity and can be effectively mixed with each other without being biased in the mixing step.

The moisture content in the powder mixture is measured at a setting temperature of 200° C. using a heat-drying type moisture meter (MX-50, manufactured by A&D Co., Ltd.).

Next, the heating step will be described.

In the present invention, the heating step is a step of heating the mixing powder containing the powder of CHA-type zeolite and the powder of Cu salt obtained as described above.

An example of a heating unit may include a heating furnace such as a muffle furnace (KDF-S100, manufactured by Denken-Highdental Co., Ltd.) or an atmosphere furnace (FQ-5270, manufactured by Chugai Ro Co., Ltd.).

A heating temperature is preferably 250 to 800° C. With the heating temperature of 250° C. or higher, Cu can be efficiently carried on zeolite. In addition, with the heating temperature of 800° C. or lower, a crystal structure of zeolite is hardly destroyed. Further preferably, the heating temperature is 400 to 800° C.

A heating atmosphere may be in an air atmosphere or an inert gas atmosphere such as nitrogen or argon.

A heating pressure can be an atmospheric pressure.

A heating time is, for example, 0.5 to 24 hours, and preferably 1 to 12 hours.

By such a heating step, the CHA-type zeolite is obtained in which Cu-ion exchange is performed.

The CHA-type zeolite before the heating step of the present invention is preferably $NH_4^+$-type zeolite or $H^+$-type zeolite. When such zeolite is treated in the heating step, it is possible to efficiently produce the CHA-type zeolite on which Cu is carried.

As a method of preparing the $NH_4^+$-type zeolite, there is a method of performing ion exchange on the zeolite obtained by synthesis using an ammonia solution. Examples of the ammonia solution may include ammonia water, an aqueous solution of ammonium sulfate, and an aqueous solution of ammonium nitrate. An ammonia concentration in the ammonia solution is, for example, 1 to 10% by mass.

The ion exchange method using the ammonia solution can be performed by immersing zeolite into the ammonia solution. A temperature of the ammonia solution is, for example, 4 to 50° C., and an immersion time at atmospheric pressure is, for example, 0.1 to 2 hours. In this way, the $NH_4^+$-type zeolite is obtained.

As a method of preparing the $H^+$-type zeolite, there is a method of heating the $NH_4^+$-type zeolite obtained as described above.

A heating temperature is, for example, 350 to 650° C.

A heating time is, for example, 0.5 to 48 hours.

As a heating unit, a commercially available heating furnace can be used.

The crystal structure of the zeolite is analyzed using an X-ray diffraction (XRD) apparatus. In an X-ray diffraction spectrum of the CHA-type zeolite by an X-ray powder analysis method, peaks corresponding to the (211) plane, (104) plane, and (220) plane of a CHA-type zeolite crystal appear respectively at $2\theta$=around 20.7°, around 25.1°, and around 26.1°.

Next, XRD measurement is performed with an X-ray diffractometer (manufactured by Rigaku Corporation, Ultima IV). Measurement conditions are as follows:

radiation source: CuKα ($\lambda$=0.154 nm),
measurement method: FT method,
diffraction angle: $2\theta$=5 to 48°,
step width: 0.02°,
integration time: 1 second,
divergence slit and scattering slit: 2/3°,
vertical divergence limiting slit: 10 mm,
acceleration voltage: 40 kV, and
acceleration current: 40 mA.

The weight of the sample is set not to change 0.1% or more before and after the XRD measurement. The obtained XRD data is subjected to peak search with use of JADE 6.0 (X-ray powder diffraction pattern integrated analysis software). In addition, the half-value width and integrated intensity of each peak are calculated. The conditions for peak search are as follows:

filter type: parabola filter,
Kα2 peak: eliminated,
peak position: peak top,
threshold value σ: 3,
peak intensity % cut-off: 0.1,
range for determining BG: 1, and
the number of points for averaging BG: 7.

Based on the obtained data, a total integrated intensity $X_0$ of the (211) plane ($2\theta$=around 20.7°), the (104) plane ($2\theta$=around 25.1°), and the (220) plane ($2\theta$=around) 26.1° of the zeolite can be calculated. Then, the integrated intensities of the peaks of the (211) plane, the (104) plane, and the (220) plane of the zeolite are employed here because influence of water absorption by the sample is small.

In the zeolite of the present invention, the total integrated intensity $X_0$ is preferably 50,000 or more.

The zeolite produced according to the present invention preferably has a Cu/Al (molar ratio) of 0.2 to 0.5.

When the molar ratio is 0.2 or more, high NOx purifying performance can be obtained with a small amount of zeolite. In addition, when the molar ratio is 0.5 or less, it is possible to prevent deterioration of NOx purifying performance due to ammonia oxidation at a high temperature. The Cu/Al molar ratio can be measured using a fluorescent X-ray analyzer.

More preferably, the Cu/Al (molar ratio) is 0.25 to 0.48.

The $SiO_2/Al_2O_3$ composition ratio (SAR) of the zeolite of the present invention is less than 15. The $SiO_2/Al_2O_3$ composition ratio refers to a molar ratio (SAR) of $SiO_2$ relative to $Al_2O_3$ in the zeolite. Since the $SiO_2/Al_2O_3$ composition ratio is less than 15, the number of acid sites of the zeolite can be made sufficient. The acid sites can be used in ion-exchange with metal ions and a large amount of Cu can be carried, and thus the zeolite has excellent NOx purifying performance. Further, when the SAR is less than 15, the amount of the Cu salt relative to the zeolite in the powder mixture is increased, so that the effect can be further exerted due to the solid-state ion exchange.

More preferably, the $SiO_2/Al_2O_3$ composition ratio is 10 to 14.9.

The molar ratio ($SiO_2/Al_2O_3$) of the zeolite can be measured by fluorescent X-ray analysis (XRF).

The zeolite produced according to the present invention has an average particle size of preferably 0.5 μm or less and more preferably 0.1 to 0.4 μm. In a case of using the zeolite having the small particle size, that is, the average particle size of 0.5 μm or less, a powder mixture is obtained in which the zeolite and the powder of Cu salt are easily mixed with each other and the powder of Cu salt is not biased, so that the amount of Cu to be carried can be prevented from being partially different. In a case where a honeycomb catalyst is produced using the Cu-carried CHA-type zeolite having the average particle size of 0.5 μm or less, the amount of water absorption displacement is small. Therefore, cracks are unlikely to occur during production of the honeycomb catalyst and use as a catalyst, and a honeycomb catalyst excellent in heat resistance and endurance is obtained. On the other hand, when the average particle size exceeds 0.5 μm, the amount of water absorption displacement becomes large when the zeolite is formed into a honeycomb catalyst, which may cause cracks in the honeycomb catalyst.

The average particle size of the zeolite is obtained by taking a SEM photograph of the zeolite with a scanning electron microscope (SEM, manufactured by Hitachi High-Technologies Corporation, S-4800) and averaging the lengths of all diagonal lines of 10 particles. The measurement conditions are set to acceleration voltage: 1 kV, emission: 10 μA, and WD: 2.2 mm or less. In general, the particles of the CHA-type zeolite have a cubic shape and have a square shape in a two-dimensional SEM photograph. Accordingly, each particle includes two diagonal lines.

EXAMPLE

Examples more specifically describing the present invention are given in the following. It is to be noted that the present invention is not limited only to these examples.

Example 1

(Mixing Step)

A raw material composition was prepared by mixing colloidal silica (manufactured by Nissan Chemical Industries, Ltd., SNOWTEX) as a Si source, a dried aluminum hydroxide gel (manufactured by Tomita Pharmaceutical Co., Ltd.) as an Al source, sodium hydroxide (manufactured by Tokuyama Corporation) and potassium hydroxide (manufactured by Toagosei Co., Ltd.) as alkali sources, a 25% aqueous solution of N,N,N-trimethyl adamantane ammonium hydroxide (TMAAOH) (manufactured by Sachem) as a structure directing agent (SDA), SSZ-13 as a seed crystal, and deionized water. A molar ratio of the raw material composition was set to have $SiO_2$: 15 mol, $Al_2O_3$: 1 mol, NaOH: 2.6 mol, KOH: 0.9 mol, TMAAOH: 1.1 mol, and $H_2O$: 300 mol. To the $SiO_2$ and $Al_2O_3$ in the raw material composition, 5.0% by mass of the seed crystal was added. The raw material composition was charged into a 500-L autoclave and subjected to hydrothermal synthesis at a heating temperature of 160° C. for a heating time of 48 hours. Subsequently, in order to remove TMAAOH remaining in pores of the zeolite, heat treatment was performed at 550° C. for four hours in the air.

After dissolving 1 mol of ammonium sulfate in 1 L of water, 1 g of zeolite obtained above was added to 4 g of the solution obtained above and stirred at atmospheric pressure for one hour to obtain $NH_4^+$-type zeolite.

The $NH_4^+$-type zeolite obtained above was subjected to heat treatment at 550° C. for four hours in the air to obtain $H^+$-type zeolite.

Subsequently, powder of copper (II) acetate was mixed with the $H^+$-type zeolite obtained above such that the amount of Cu became 4.5% by mass to obtain a powder mixture. In the mixing step, a mortar was used, a mixing temperature was a room temperature, and a mixing time was 0.5 hour. In addition, the moisture content of the powder mixture was 4.8% by mass.

(Heating Step)

The powder mixture obtained in the above mixing step was subjected to heat treatment. A heating apparatus and heating conditions are as follows:
Heating apparatus: model number FQ-5270, manufactured by Chugai Ro Co., Ltd.,
Heating temperature: 700° C.,
Heating atmosphere: $N_2$ atmosphere,
Heating pressure: atmospheric pressure, and
Heating time: 5 hours.

As described above, the Cu-carried zeolite having the CHA structure was produced.

<Analysis of Crystal Structure of Zeolite>

With an X-ray diffractometer (Ultima IV, manufactured by Rigaku Corporation), the zeolite obtained in Example 1 and the zeolite before the heating step were subjected to XRD measurement, and $X_0$ was calculated, wherein the $X_0$ being a total integrated intensity of (211) plane, (104) plane, and (220) plane of an X-ray diffraction spectrum.

The measurement conditions were set to radiation source: CuKα ($\lambda$=0.154 nm), measurement method: FT method, diffraction angle: 2θ=5 to 48°, step width: 0.02°, integration time: 1 second, divergence slit and scattering slit: 2/3°, vertical divergence limiting slit: 10 mm, acceleration voltage: 40 kV, and acceleration current: 40 mA.

The obtained XRD data was analyzed with use of JADE 6.0 (X-ray powder diffraction pattern integrated analysis software). The analysis conditions were set to filter type: parabola filter, Kα2 peak: eliminated, peak position: peak top, threshold value σ: 3, peak intensity % cut-off: 0.1, range for determining BG: 1, and the number of points for averaging BG: 7.

The results are indicated in Table 1.

FIG. 1 illustrates an XRD pattern of zeolite synthesized in Example 1.

It was confirmed in FIG. 1 that the zeolite synthesized in Example 1 was zeolite having a CHA structure.

<Analysis of Ion Exchange Efficiency>

Heat treatment was further performed on the Cu-carried zeolite having the CHA structure obtained after completion of the heating step. A heating apparatus and heating conditions are as follows:
Heating apparatus: model number KDF-S100, manufactured by Denken-highdenntal Co., Ltd.,
Heating temperature: 700° C.,
Heating atmosphere: air atmosphere,
Heating pressure: atmospheric pressure, and
Heating time: 4 hours.

In a case where the $H^+$-type zeolite is not ion-exchanged by Cu ions, when the X-ray diffraction spectrum of the zeolite after the further heat treatment is acquired, peaks corresponding to a (002) plane and a (111) plane of CuO appear respectively at 2θ=around 35.4° and around 38°. The integrated intensity ($X_1$) of the (002) plane and the (111) plane of CuO is measured, and thus the ion exchange efficiency of the zeolite due to Cu ions can be analyzed.

Next, XRD measurement is performed with an X-ray diffractometer (manufactured by Rigaku Corporation, Ultima IV). Measurement conditions are as follows:
radiation source: CuKα ($\lambda$=0.154 nm),
measurement method: FT method,
diffraction angle: 2θ=30 to 45°,
step width: 0.02°,
integration time: 5 seconds,
divergence slit and scattering slit: 2/3°,
vertical divergence limiting slit: 10 mm,
acceleration voltage: 40 kV, and
acceleration current: 40 mA.

The weight of the sample is set not to change 0.1% or more before and after the XRD measurement. The obtained XRD data is subjected to peak search with use of JADE 6.0 (X-ray powder diffraction pattern integrated analysis software). In addition, the half-value width and integrated intensity of each peak are calculated. The conditions for peak search are as follows:
filter type: parabola filter,
Kα2 peak: eliminated,
peak position: peak top,
threshold value σ: 3,
peak intensity % cut-off: 0.1,
range for determining BG: 1, and
the number of points for averaging BG: 7.

The results are indicated in Table 1.

<Measurement of Amount of Cu to be Carried>

With a fluorescent X-ray analyzer (XRF, manufactured by Rigaku Corporation, ZSX Primus 2), the amount of Cu to be carried on the zeolite obtained in Example 1 was measured. Measurement conditions were set to X-ray tube: Rh, rated maximum output: 4 kW, element range of detection: F to U, quantification method: SQX method, and analyzing range: 10 mmφ. The molar ratio of Cu/Al was calculated from the measured value of the amount of Cu to be carried.

The results are indicated in Table 1.

<Measurement of Molar Ratio (SAR: $SiO_2/Al_2O_3$) of Zeolite>

With a fluorescent X-ray analyzer, (XRF, manufactured by Rigaku Corporation, ZSX Primus2), the molar ratio (SAR: $SiO_2/Al_2O_3$) of the (initial) zeolite obtained in Example 1 was measured. Measurement conditions were set to X-ray tube: Rh, rated maximum output: 4 kW, element range of detection: F to U, quantification method: SQX method, and analyzing range: 10 mmφ.

The results are indicated in Table 1.

<Measurement of Particle Size of Zeolite>

With a scanning electron microscope (SEM, manufactured by Hitachi High-Technologies Corporation, S-4800), an SEM photograph of the zeolite obtained in Example 1 was taken and the particle size of the zeolite was measured. Measurement conditions were set to acceleration voltage: 1 kV, emission: 10 μA, and WD: 2.2 mm or less. The measuring magnification was set to 20,000 times. The particle size was measured for ten particles measured based on two diagonal lines, and the average particle size of thereof was obtained.

The results are indicated in Table 1.

Examples 2 to 5

Zeolite was prepared in the same manner as in Example 1 except that a powder of Cu salt indicated in Table 1 was used. However, a heating atmosphere in a heating step was air in Example 2.

With respect to the zeolite obtained above, analysis of a crystal structure of zeolite, analysis of ion exchange efficiency, measurement of Cu to be carried, measurement of molar ratio of zeolite, and measurement of particle size of zeolite were performed in the same manner as in Example 1.

The results are indicated in Table 1.

Reference Example 1

With respect to the H$^+$-type zeolite obtained in Example 1, the pH was adjusted to 9 using an aqueous solution of copper (II) sulfate having a concentration of 0.5% by mass and ammonia water, and then ion exchange was performed under conditions of solution temperature of 50° C., atmospheric pressure, and an immersion time of 2 hours. Further, after the concentration of the solution was adjusted to 0.5% by mass and the pH was adjusted to 9 on all such occasions, ion exchange was repeated twice to obtain zeolite in which Cu ions were exchanged.

In addition, it was found from the results in Table 1 that the Cu-carried zeolite having the CHA structure produced in each of Examples 1 to 5 has the total integrated intensity ($X_0$) of 55,000 or more and the crystal structure of the zeolite was maintained without being impaired.

Although the present invention has been described in detail and with reference to specific embodiments, it will be apparent to those skilled in the art that various changes and modifications can be made without departing from the spirit and scope of the invention. This application is based upon and claims the benefit of priority from Japanese Patent Application No. 2015-111578, filed Jun. 1, 2015, the entire contents of which are incorporated herein by reference.

The invention claimed is:

1. A method for producing zeolite having a CHA structure in which Cu is carried, the method comprising:
   mixing a powder of the zeolite having the CHA structure and a powder of Cu salt, which is at least one salt selected from the group including copper sulfate, copper nitrate, copper acetate, and copper chloride, with each other to produce powder mixture; and
   heating the powder mixture under atmospheric pressure.

2. The method for producing zeolite according to claim 1, wherein a moisture content of the powder mixture is 30% by mass or less.

3. The method for producing zeolite according to claim 1, wherein a heating temperature during the heating of the powder mixture is 250 to 800° C.

4. The method for producing zeolite according to claim 1, wherein the Cu salt is the copper nitrate, and
   wherein an atmosphere during the heating of the powder mixture is an oxidizing atmosphere.

5. The method for producing zeolite according to claim 1, wherein a Cu/Al (molar ratio) is 0.2 to 0.5 in the zeolite having the CHA structure in which the Cu is carried.

TABLE 1

| | Cu salt | Moisture amount of powder mixture (wt %) | Total integrated intensity ($X_0$) | Integrated intensity ($X_1$) of (111) plane of CuO | Cu/Al ratio (Molar ratio) | SAR | Average particle size (μm) |
|---|---|---|---|---|---|---|---|
| Example 1 | Copper (II) acetate | 4.8 | 60869 | 0 | 0.33 | 12.9 | 0.49 |
| Example 2 | copper (II) nitrate | 4.8 | 59777 | 483 | 0.32 | 12.8 | 0.49 |
| Example 3 | copper (II) sulfate | 4.8 | 56922 | 573 | 0.34 | 13 | 0.49 |
| Example 4 | copper (I) chloride | 4.8 | 60339 | 0 | 0.33 | 12.9 | 0.49 |
| Example 5 | copper (II) chloride | 4.8 | 60829 | 697 | 0.33 | 12.9 | 0.49 |
| Reference Example 1 | Copper acetate (Liquid state) | — | 59985 | 0 | 0.33 | 12.9 | 0.49 |

From the results in Table 1, the zeolite obtained in each of Examples 1 to 5 was produced by the producing method including the mixing step of mixing the powder of zeolite having the CHA structure and the powder of Cu salt and the heating step of heating the obtained powder mixture, the integrated intensity ($X_1$) of CuO is 700 or less, that is, CuO was not contained, and the ion exchange efficiency of Cu was high. From the results, it is possible to effectively utilize Cu and to reduce the production cost.

6. The method for producing zeolite according to claim 1, wherein a $SiO_2/Al_2O_3$ composition ratio (SAR) is less than 15 in the zeolite having the CHA structure in which the Cu is carried.

7. The method for producing zeolite according to claim 1, wherein an average particle size is 0.5 μm or less in the zeolite having the CHA structure in which the Cu is carried.

* * * * *